J. MORTON.
Road-Scrapers.
No. 141,808.
Patented August 12, 1873.
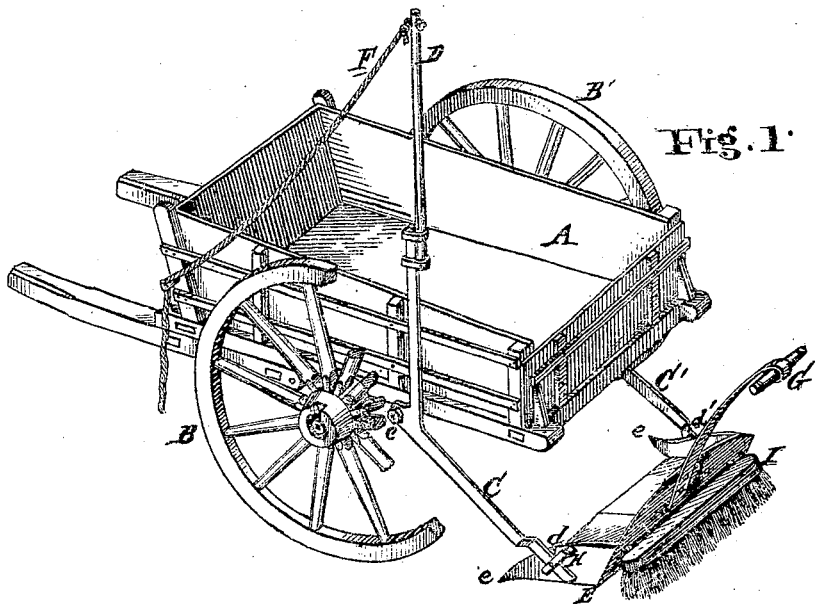
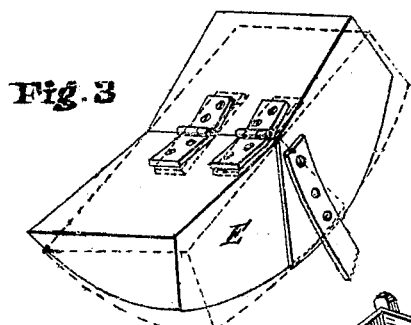
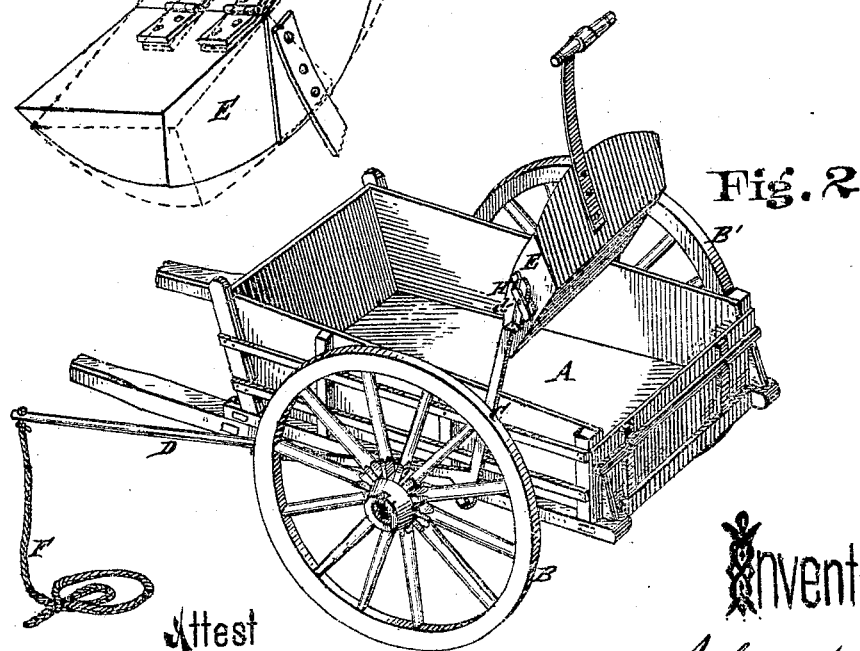
Attest
Inventor
John Morton
By F. Millward
Attorney.

UNITED STATES PATENT OFFICE.

JOHN MORTON, OF CINCINNATI, OHIO, ASSIGNOR TO HIMSELF AND GEORGE S. HUNTINGTON.

IMPROVEMENT IN ROAD-SCRAPERS.

Specification forming part of Letters Patent No. 141,808, dated August 12, 1873; application filed May 15, 1873.

*To all whom it may concern:*

Be it known that I, JOHN MORTON, of Cincinnati, Hamilton county, State of Ohio, have invented certain new and useful Improvements in Road-Scraping Machines, of which the following is a specification:

My invention relates to the class of road-scrapers mounted on wheels and drawn by horses, in which the dirt scraped off the road is carried into and by the body of the vehicle; and my invention consists of a dirt-carrying cart, to which is attached a swinging frame carrying a scraper, and, if necessary, a brush in addition, the swinging scraper-frame being operated by the driver of the vehicle, so that as the scraper becomes full it shall be raised and its dirt emptied into the vehicle, the scraper returning, after the emptying, to the road for further duty.

Figure 1 is a perspective view of a road-scraper embodying my invention, the scraper being, in this figure, in a position for operation on the road. Fig. 2 is a perspective view of the same, showing the scraper in the position for discharging the dirt or other material raised by it into the cart. Fig. 3 is a modification in construction of the scraper.

A is the body of the vehicle, and B B the wheels on which it moves. It is intended to be propelled by horses or other animal power, and the manual power of the driver is that employed to lift the dirt, gravel, &c., and deposit the same in the cart. A frame, C C', is hinged or journaled to the cart, as shown at c, which is provided with a long lever for the hand of the driver to use, and has pivoted to it a scraper, E, which removes and holds the dirt, gravel, sand, &c., required to be collected by it. The lever D, for the driver to operate, may be provided with a draw or pulling rope, F, to facilitate its convenient manipulation. I prefer to make the scraper E in two parts, hinged together, as clearly shown in the under view of it in Fig. 3, so that it may accommodate itself automatically to the "crown" of a paved street. The scraper E is provided at the rear with a handle, G, by which it may be manipulated by any person following the machine. The scraper E is so constructed and connected to the frame C C', at pivot-points $d\ d'$, that when raised partially by the driver or follower it gravitates so as to throw the material in it well back, so that it may be raised safely. To prevent the scraper from swinging too far on pivots $d\ d'$, the arms C C' are arranged to stop at the desired point against the base of the guides H. When the scraper E, however, is made with spreading wings $e$ at the edge to cover the width of tread of the wheels, these wings form stops against the arms C C' for the same purpose. The brush I may be attached to the back of the scraper, so that, when the scraper is tilted up a little by means of handle G, the brush alone may operate on the street for collecting dust and light dry dirt from streets, and when sufficient dust is brushed up the cart may be backed a little, and the pile picked up by the scraper and thrown into the cart. When the cart is filled, the lever D may be detached from the frame C C', and the scraper E may also be detached, so that both these parts may be employed on another cart while the first is being hauled away.

It is obvious that gearing may be employed to facilitate the lifting of the weight by the driver.

The frame C C' may have for its journals the axle of the cart, if preferred to separate journals.

I claim—

1. In combination with the cart A B B', the swinging frame C C' and scraper E, operating substantially in the manner and for the purpose described.

2. The combination of cart A B B', frame C C', scraper E, and brush I, operating substantially as and for the purpose described.

3. The scraper E, when made in two parts, hinged together, substantially as and for the purpose specified.

4. In combination with the swinging frame C C' of the cart, the scraper E, when pivoted at $d\ d'$ to oscillate, and provided with stops H $e$, substantially as and for the purpose specified.

In testimony of which invention I hereunto set my hand.

JOHN MORTON.

Witnesses:
FRANK MILLWARD,
J. L. WARTMANN.